July 28, 1959
O. A. GIANNINY, JR., ET AL
2,897,009
CONVEYOR SYSTEM FOR FINE SOLIDS
Filed Nov. 12, 1957
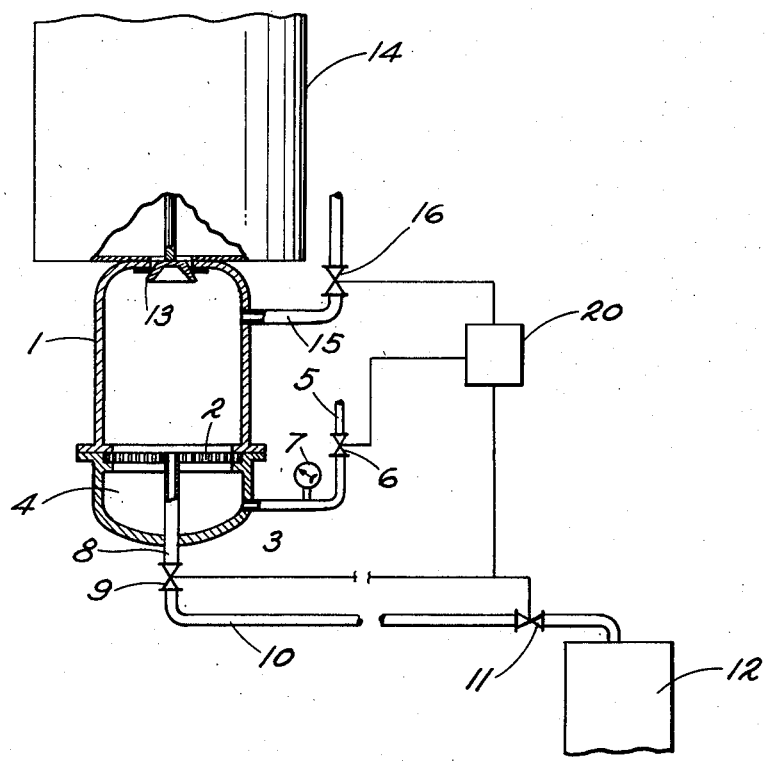
INVENTORS
OMER A. GIANNINY, JR.
& JOHN A. ROLSTON.
BY
RICHEY, WATTS, EDGERTON,
McNENNY & FARRINGTON.
ATTORNEYS

United States Patent Office 2,897,009
Patented July 28, 1959

2,897,009

CONVEYOR SYSTEM FOR FINE SOLIDS

Omer A. Gianniny, Jr., and John Albert Rolston, Charlottesville, Va., assignors to A-S-H Industries, Inc., Narberth, Pa., a corporation of Pennsylvania Application November 12, 1957, Serial No. 695,842

4 Claims. (Cl. 302—53)

This invention relates to a system for conveying fine solids and is particularly concerned with a new method of conveying separate batches of fine solids.

Heretofore, systems have been proposed for pneumatically conveying fine solids in which the solids were "fluidized" in a chamber by air blown into the solids and were then transported in a pipe line with air under pressure. When substantially all the solids had been removed from the chamber the air supply was shut off, and the chamber was opened and recharged with solids. Any solids which were in the pipe line when the air supply was shut off collected on the wall of the pipe line and such solids were not readily picked up by any subsequently created flow of air through the pipe. These characteristics limited the use of those systems to continuous operations or to batch operations in which the solids could not collect to a material extent in the pipe line. Since there are many instances in which it is desirable, if not essential, to be able to operate batchwise a system in which the solids would collect in the pipe line if permitted to do so, there exists a large unfilled need for fluidizing systems which many other workers in the art have tried, but failed, to satisfy.

The present invention aims to solve that long standing problem and does so by confining in the pipe line the fluidized solids under pressure while another batch of solids is being made ready for admission into the pipe line.

The figure accompanying and forming a part of this specification is a diagrammatic drawing of one form of system embodying, and useful in carrying out, the present invention.

In the figure, 1 indicates a storage tank which is adapted to contain a quantity of fine solids under pressure. It will be understood that various means may be provided for fluidizing the solids and for removing the fluidized solids from the storage tank. Such means include apparatus for discharging air under pressure within the body of solids from the storage tank and removing the thus fluidized solids from the tank. The embodiment of these means illustrated and specifically described herein includes a porous membrane or disc 2 near the bottom of the storage tank which will permit the passage therethrough of air under pressure but will retain thereon the finely divided solids which are transported pneumatically. Between the disc 2 and the bottom of the tank 3 there exists a space or chamber 4 into which air under pressure may flow from a source of supply (not shown) through pipe line 5 which is equipped with a valve 6 and a pressure gauge 7. A pipe 8 leads from the interior of the pressure chamber in tank 1 above disc 2, and preferably from substantially flush with the top surface of disc 2, down through chamber 4 and out through the bottom 3 of tank 1. A valve 9 serves to control the flow of air and solids into portion 10 of line 8 while valve 11 at the other end of this portion of line 8 controls the outlet from that portion. Line 8 discharges into a receiver 12.

It is to be understood that the zone of fluidization need not necessarily be in contact with the top surface of the disc 2 but that, on the contrary, the fluidizing may take place some distance above the disc; and also that the pipe 8 may extend above the top of disc 2. However, the inlet end of pipe 8 should lie in the fluidized zone of solids. While pipe 8 is shown as being cylindrical at its inlet end, experiments have indicated that it might advantageously be funnel-shaped for apparently such a shape tends to decrease the pressure drop at the inlet end of the pipe.

The upper end of tank 1 is provided with an inlet opening which is controlled by bell valve 13 and through this opening solids to be fluidized and transported may flow into tank 1 from storage bin 14. It will be understood that various types of valves such, for example, as a slide valve, may be employed instead of the bell type of valve shown at 13.

Near its upper end tank 1 is provided with a vent pipe 15 which is controlled by a valve 16.

Means indicated schematically at 20 may be used for automatically controlling valves 6, 9, 11 and 16 and this means may be manual or automatic, as desired. When the charge of solids in tank 1 has been largely discharged into receiver 12 and it is desired to recharge tank 1, the control means 20 may be actuated to close valves 9, 11 and 6 and then to open valve 16. Closing valves 9 and 11 results in trapping a quantity of the fluidized solids under pressure in the pipe line between those two valves. Closing valve 6 and opening valve 16 cuts off the flow of fluid under pressure into the pressure chamber of bin 1 and permits the excess pressure to escape whereupon bell valve 13 may be lowered and solids in bin 14 may flow into bin 1. When that bin has been recharged to the desired extent, valve 13 is closed and control means 20 is actuated to close valve 16, open valve 6 and, after pressure has been built up in bin 1 to the desired extent, to open valves 9 and 11.

While it has been generally considered to be bad practice to shut down a conveying unit with solids in the line because the solids tend to fall out and pile up in the pipe line, perhaps with the complete plugging of the latter, it has been found to be exceptionally good practice to shut down a conveying line having parts constructed and arranged as above disclosed.

By trapping the fluidized solids between valves 9 and 11 under pressure, the fluidized condition will be renewed following the reopening of the valves 9 and 11. If, after the recharging and build-up of air pressure in bin 1, valve 9 is opened, there will be no stoppage as a result but, on the contrary, flow of the fluidized solids into the receiver 10 will begin upon opening of valve 11.

Having thus described this invention in such full, clear, concise and exact terms as to enable any person skilled in the art to which it pertains to make and use the same, and having set forth the best mode contemplated of carrying out this invention, we state that the subject-matter which we regard as being our invention is particularly pointed out and distinctly claimed in what is claimed, it being understood that equivalents or modifications of, or substitutions for, parts of the above specifically described embodiment of the invention may be made without departing from the scope of the invention as set forth in what is claimed.

What is claimed is:

1. A system for handling fine solids comprising the steps of charging a quantity of fine solids into a pressure chamber, closing the chamber, admitting air under pressure into the chamber in a manner to fluidize the solids near an outlet from the chamber and to build up a predetermined air pressure in the chamber, opening a pipe communicating with the outlet from the chamber and allowing solids and air to flow through the pipe while continuing the admission of air into the chamber, and closing the pipe at two spaced-apart places and thereby retaining a quantity of solids and air under pressure between said places, opening the chamber, recharging it with solids and air under pressure and then opening the pipe at said two spaced places.

2. A system for handling fine solids comprising the steps of charging a quantity of fine solids into a pressure chamber, closing the chamber, admitting air under pressure into the chamber in a manner to fluidize the solids near an outlet from the chamber and to build up a predetermined air pressure in the chamber, opening a pipe communicating with the outlet from the chamber and allowing solids and air to flow through the pipe while continuing the admission of air into the chamber, closing the pipe at two spaced-apart places and thereby retaining a quantity of solids and air under pressure between said places, reducing the air pressure in the chamber to substantially atmospheric pressure, charging solids into the chamber, admitting air under pressure into the chamber to fluidize the solids therein and to bring the pressure up to the predetermined amount and then opening the pipe at the two said places.

3. A system for handling batches of fine solids comprising the steps of charging a batch of such solids into a chamber, fluidizing said solids by admitting air under pressure thereinto, removing the fluidized solids from the chamber and transporting them through a pipe by means of air under pressure in the chamber, trapping fluidized solids and air in the pipe by closing it at spaced places, reducing the pressure in the chamber, recharging the chamber with solids and air under pressure and then opening the pipe at said spaced places.

4. A system for handling batches of fine solids comprising the steps of charging a batch of such solids into a chamber, fluidizing said solids by admitting air under pressure thereinto, transporting said fluidized solids through a pipe by allowing air under pressure and carrying said fluidized solids to escape from the chamber and to flow through said pipe, closing said pipe at spaced places while air under pressure and carrying said solids is flowing therethrough, opening the chamber, recharging the chamber with solids, admitting air under pressure into the chamber and fluidizing the solids, and opening the pipe at said places after the chamber has again been charged with solids and air under pressure.

References Cited in the file of this patent
UNITED STATES PATENTS

| | | |
|---|---|---|
| 1,898,354 | Fickey | Feb. 21, 1933 |
| 1,898,356 | Fickey | Feb. 21, 1933 |
| 2,027,697 | Nielsen | Jan. 14, 1936 |
| 2,115,023 | Kennedy | Apr. 26, 1938 |